Figure 1:
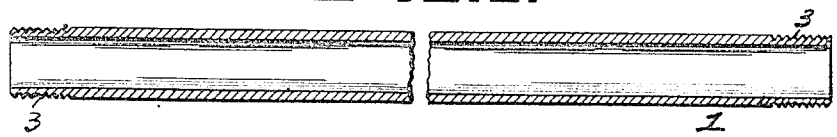

P. McILROY.
CONDUIT OR PIPE AND PROCESS OF TREATING THE SAME.
APPLICATION FILED APR. 22, 1914.

1,120,731.

Patented Dec. 15, 1914.
2 SHEETS—SHEET 1.

Witnesses:
T. B. Humphries.
W. H. Humphries.

Inventor:
Peter McIlroy.
By J. W. Cooke,
Attorney.

P. McILROY.
CONDUIT OR PIPE AND PROCESS OF TREATING THE SAME.
APPLICATION FILED APR. 22, 1914.

1,120,731.

Patented Dec. 15, 1914.
2 SHEETS—SHEET 2.

Witnesses:
L. G. Coots
J. W. Mayfield

Inventor:
Peter McIlroy.
By J. N. Cooke
Attorney.

UNITED STATES PATENT OFFICE.

PETER McILROY, OF PITTSBURGH, PENNSYLVANIA, ASSIGNOR TO ENAMELED METALS COMPANY, OF SHARPSBURG, PENNSYLVANIA, A CORPORATION OF PENNSYLVANIA

CONDUIT OR PIPE AND PROCESS OF TREATING THE SAME.

1,120,731.

Specification of Letters Patent.

Patented Dec. 15, 1914.

Application filed April 22, 1914. Serial No. 833,791.

*To all whom it may concern:*

Be it known that I, PETER McILROY, a citizen of the United States, and resident of Pittsburgh, North Side, in the county of Allegheny and State of Pennsylvania, have invented a new and useful Improvement in Conduits or Pipes and Processes of Treating the Same; and I do hereby declare the following to be a full, clear, and exact description thereof.

My invention relates to coated pipes, and to the treatment of enameled coated pipes for use as electrical conduits for containing electric wires and for other purposes.

In the manufacture of coated pipes for electrical conduits, the pipe is cleaned to remove scale and slag therefrom, then the ends of the pipe are threaded, then a threaded coupling or fitting is placed on one of said ends and it projects beyond said end. The pipe is then coated with enamel by dipping, then dried to finish same, which dipping and drying are repeated so that it is ready for shipment and use. Another length of pipe is adapted to be connected to such projecting end of the coupling by its threaded end and successive lengths can be connected in like manner.

The object of my invention is to provide a cheap and novel manner of treating coated metal pipes wherein the projecting threaded end of the coupling of the pipe is protected from the coating or enamel into which the same is dipped, and thus prevent said coupling threads from being filled up or choked with the coating fluid, while a further object of the invention is to provide a protector for the exposed threads of the conduit coupling which will securely inclose the same and which can be very quickly applied before coating and can be very quickly removed when the conduit is finished or at the point where the conduit is to be used.

A still further object of my invention is to provide a conduit coupling in which its exposed threaded end will be clean so that the threads thereof will not need to be cleaned before the same can be used in connecting up with the threaded end on another conduit, which will thus make good electrical connection with such next succeeding conduit, and thus overcome the objections to open circuits where a good connection is not made between the successive lengths of the same.

To these ends my invention consists, generally stated, in the novel method and article, as hereinafter more specifically set forth and described, and particularly pointed out in the claims.

To enable others skilled in the art to which my invention appertains to construct to practice my improved method and produce my improved conduit, I will describe the same more fully referring to the accompanying drawing, in which:—

Figure 2:
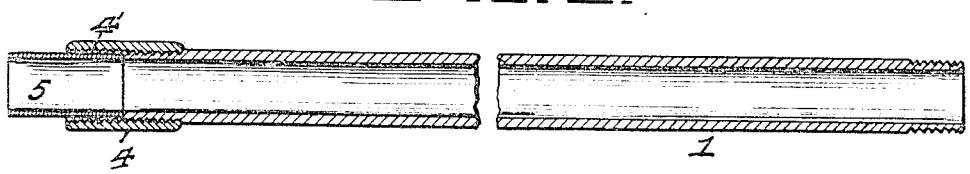
Figure 3:
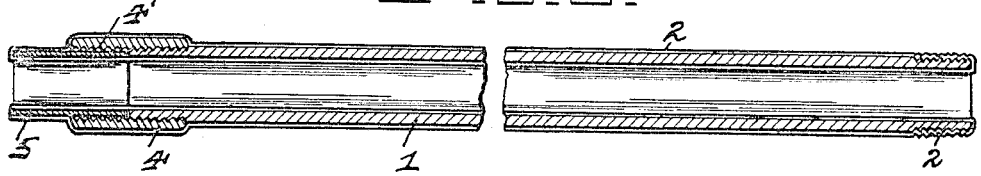
Figure 4:
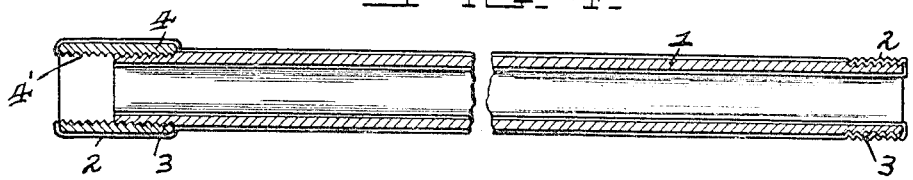
Figure 5:
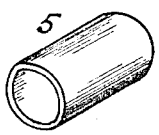
Figure 6:
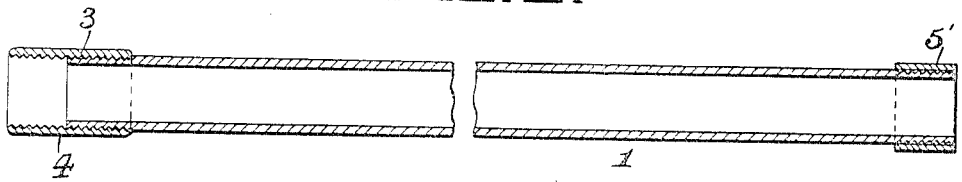
Figure 7:
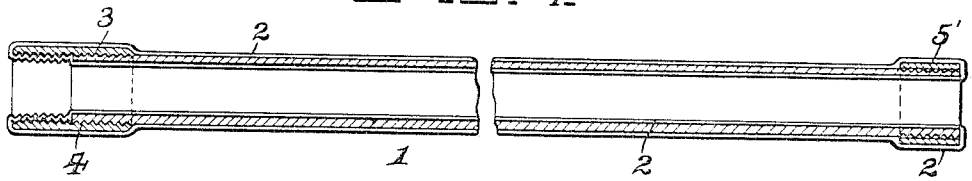
Figure 8:
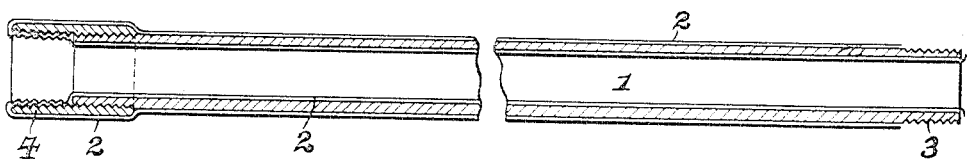
Figure 9:
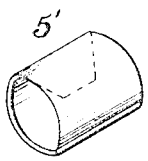

Figure 1 is a longitudinal sectional view of the threaded pipe ready for treatment. Fig. 2 is a like view of the pipe before treatment and with the coupling and its protector applied. Fig. 3 is a like view of the same after coating. Fig. 4 is a side view of the pipe after the protector has been removed. Fig. 5 is a perspective view of the protector employed. Fig. 6 is a longitudinal sectional view of the threaded pipe before treatment showing one threaded end having the protector applied, and coupling attached to the other end. Fig. 7 is a like view of the same after coating. Fig. 8 is a like view of the same after the protector has been removed. Fig. 9 is a perspective view of the protector employed in Figs. 6 and 7.

Like symbols of reference herein indicate like parts in each of the figures of the drawing.

In practice, for the purpose of carrying out my invention, the pipe 1 is usually submerged in a weak solution of acid, preferably sulfuric, to remove slag or scale and the pipe is then removed and if necessary as in some processes, the surfaces of the same are subjected to a blast of air containing abrading material, such as sand. This sand blast process is for the purpose of removing the slag and scale which have been left after the pickling process and after this step such surfaces are left smooth and well adapted for the reception of the coating 2, which is generally formed of different materials, one form being known as enamel coating. This enamel coating 2 is applied either by dipping the pipe 1 into a fluid bath of such coating, or any other suitable way, after which the pipe is baked or air dried in order to harden said coating. If necessary, two or more coatings may be applied in order to get the desired results, and the manner of applying such coats may be performed by dipping the pipe perpendicularly or horizontally, as desired, although the former is generally practised. Before the coating 2 is applied to the pipe 1 such pipe is threaded at its ends, as at 3, in the usual manner, and the usual metal fitting or coupling 4 is placed on one of said threaded ends, by its threaded interior surface 4' with a portion of the same projecting beyond said end, while such projecting portion is provided with a protecting sleeve 5 which fits within the same over the threaded surface on such portion and its inner end abuts against said threaded pipe in said coupling. This sleeve 5 is formed of any suitable material, such as paper, linen, pulp, metal, wood, or cardboard, and it is of a sufficient length to extend from the end of the pipe 1 within the coupling 4, over the threads of such coupling beyond said pipe end to cover the same and can extend beyond said coupling if desired. The sleeve 5 will be also of such diameter as will fit closely or snugly over the exposed threaded end of the coupling 4 and if desired such sleeve when made of suitable material can be of such a diameter to be forced laterally in the coupling by a slight pressure, or can be sprung therein and held by expanding, or made of such a size so that when turned therein it will cause the threads on such end to take slightly into said sleeve.

It will be evident that when the pipe 1 has the coating 2 applied thereto that such coating will be applied on the exterior of the pipe and coupling as well as upon the interior of the pipe and protecting sleeve 5, and the material of such coating will also tend to assist in forming a connection between the pipe and sleeve by entering the joint or space between the inner end of such sleeve and pipe end in the coupling, while, if desired, the sleeve can be made loose enough to allow sufficient or a small amount of enamel to reach the threads in the projecting portion of the coupling to prevent their rusting. When the pipe is ready to be shipped the protecting sleeve can be pulled out of the coupling in any suitable manner, and such sleeve retained for further treatments of pipe, if desired, or such sleeve can remain in the coupling until it is ready for use and then withdrawn.

The advantages of my invention will be apparent to those skilled in the art since the threads on the projecting portion of the coupling pipe will be thus retained in the original condition as to shape and size, and they will be protected by the protecting sleeve, so that such pipe will reach the consumer in such shape that the threads on such portion and protected to prevent their rusting or being damaged and the pipe and coupling will be ready for instant use in coupling when received or by simply pulling out the protecting sleeve, or when a fragile sleeve is used by slitting or cutting the sleeve longitudinally to remove the same thereby leaving the threads clean to be used.

The particular solution used for loosening the scale may be changed or varied, as well as the manner of applying the same on said blast, and one or more coatings of the enamel may be applied to the pipe, while the material composing and manner of applying and removing the protector can be changed, and various other modifications and changes in the steps or in the article produced by my invention may be resorted to without departing from the spirit of the invention or sacrificing any of its advantages.

Practical experience with the method herein described has produced a much cleaner and more finished article than under the ordinary method in forming such pipe, as well as a great saving in the cost of manufacture and loss of pipe, while the cleaning of the threads on the coupling before they can be used in coupling will be overcome, and a much better article obtained than has been heretofore possible. The pipe thus formed will reduce the contractor's cost very materially, as well as a great saving in labor, and if thus made will eliminate the cleaning of the threads in the coupling with dies, etc., in order to use the same in connecting up the pipe thereto. It will also be seen in Figs. 6, 7, 8 and 9 that the other threaded end 3 of the pipe 1 from that used by the protected coupling 4 may also be provided with a protecting sleeve 5' over the threads, so that in such case the ordinary exposed threads on either or both the coupling and pipe end may be protected in coating and thereby not only have the threads in the projecting end on the coupling kept clean but also the threads on the opposite end of the pipe.

What I claim as my invention and desire to secure by Letters Patent is:

1. The process of treating a conduit unit having a threaded portion, consisting in the steps of applying a protecting sleeve to cover said threaded portion, and then applying a coating over said unit and said sleeve.

2. The process of treating a conduit unit having a threaded portion, consisting in the steps of applying a fragile protecting sleeve to cover said threaded portion, and then applying a coating over said unit and said sleeve.

3. The process of treating a conduit unit having an exteriorly threaded end, consisting in the steps of applying a protecting sleeve to cover said threaded end, and then applying a coating over said unit and said sleeve.

4. The process of treating a conduit unit having an exteriorly threaded end, consisting in the steps of applying a fragile protecting sleeve to cover said threaded end, and then applying a coating over said unit and said sleeve.

5. As a new article of manufacture, a conduit unit having a threaded portion, a protecting sleeve covering said threaded portion, and a protecting coating over said unit and sleeve.

6. As a new article of manufacture, a conduit unit having a threaded portion, a fragile protecting sleeve covering said threaded portion, and a protecting coating over said unit and sleeve.

In testimony whereof, I the said PETER McILROY have hereunto set my hand.

PETER McILROY.

Witnesses:
T. B. HUMPHRIES,
J. N. COOKE.